United States Patent [19]

Curtiss et al.

[11] E Re. 30,515

[45] Reissued Feb. 17, 1981

[54] HIGH SPEED PRINTER

[75] Inventors: Robert H. Curtiss, Wayland; Derek J. Gardiner, Sudbury; Seldan A. Lazarow, Framingham, all of Mass.

[73] Assignee: Iomec, Inc., Minnetonka, Minn.

[21] Appl. No.: 952,002

[22] Filed: Oct. 16, 1978

Related U.S. Patent Documents

Reissue of:

[64] Patent No.: 3,795,186
Issued: Mar. 5, 1974
Appl. No.: 876,770
Filed: Nov. 14, 1969

[51] Int. Cl.[3] ..... B41J 1/20

[52] U.S. Cl. ..... 101/93.14; 101/93.09

[58] Field of Search ..... 101/96, 1, 93.14, 93.15–93.17, 101/93.29–93.34, 93.48, 111; 317/137

[56] References Cited

U.S. PATENT DOCUMENTS

| | | | |
|---|---|---|---|
| 2,993,437 | 7/1961 | Demer et al. | 101/93.14 |
| 3,049,990 | 8/1962 | Brown et al. | 101/93 |
| 3,156,180 | 11/1964 | Barnes | 101/93 |
| 3,243,665 | 3/1966 | Fayer et al. | 317/137 |
| 3,289,576 | 12/1966 | Bloom et al. | 101/93 |
| 3,303,775 | 2/1967 | Giannuzzi | 101/93 |
| 3,312,174 | 4/1967 | Cunningham | 101/93 |
| 3,342,127 | 9/1967 | Pitt | 101/93 |
| 3,359,921 | 12/1967 | Arnold et al. | 101/93 |
| 3,416,442 | 12/1968 | Brown et al. | 101/93 |
| 3,423,641 | 1/1969 | Von Feldt | 317/137 |
| 3,461,796 | 8/1969 | Belson et al. | 101/93 |
| 3,467,005 | 9/1969 | Bernard | 101/93 |
| 3,582,897 | 1/1971 | Marsh | 101/93.14 X |

*Primary Examiner*—Edward M. Coven
*Attorney, Agent, or Firm*—Daniel M. Rosen

[57] ABSTRACT

A high speed line printer having a number of sets of hammers; one hammer for each character position defining a line of print, which coact with a moving type band. Each hammer time shares one of a number of drive circuits with others of the hammers in a set. A line may be printed in the time that a type font on the band moves past any particular character position.

19 Claims, 18 Drawing Figures

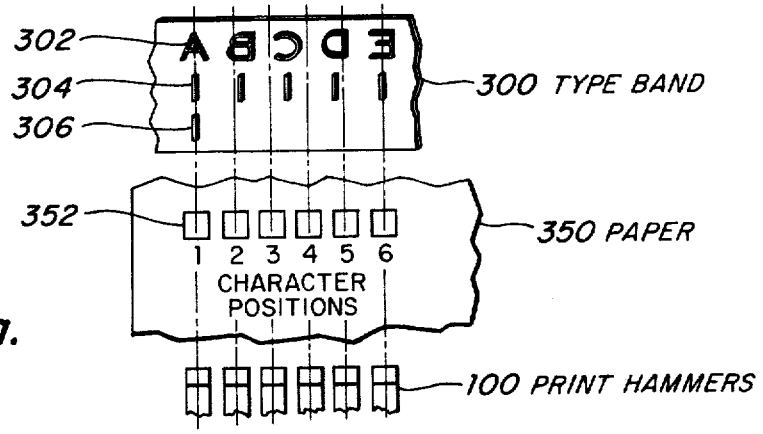
FIG. 3a.
FIG. 3b.
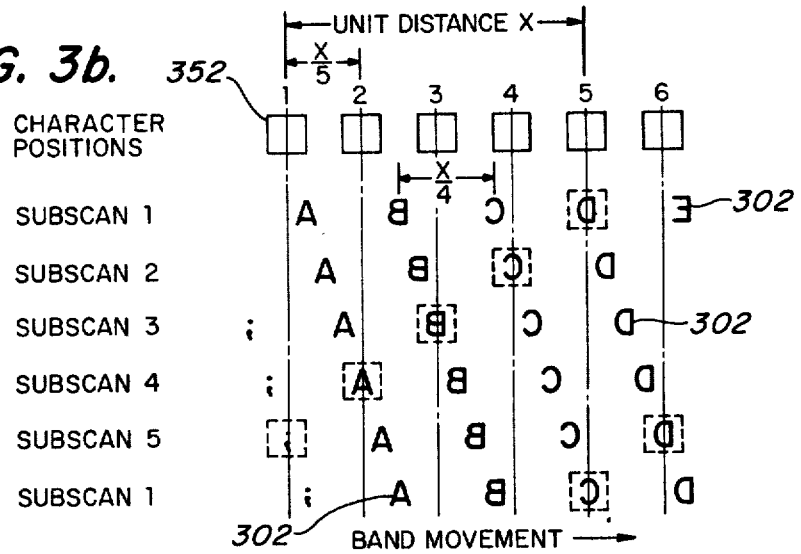
FIG. 4.
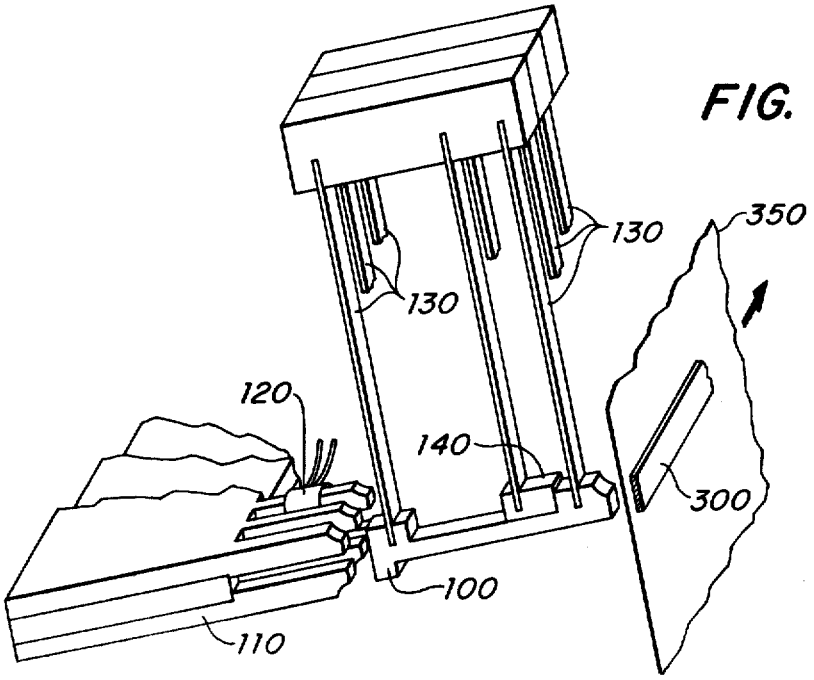

| SCAN 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| 1 | 5/00 | 10/60 | 15/56 | 20/52 | 25/48 | 30/44 | 35/40 | 40/36 | 45/32 | 50/28 | 55/24 | 60/20 | 65/16 | 70/12 | 75/08 | 80/04 | 85/00 | 90/60 | 95/56 | 100/52 | 105/48 | 110/44 | 115/40 | 120/36 | 125/32 | 130/28 | 135/24 |
| 2 | 4/01 | 9/61 | 14/57 | 19/53 | 24/49 | 29/45 | 34/41 | 39/37 | 44/33 | 49/29 | 54/25 | 59/21 | 64/17 | 69/13 | 74/09 | 79/05 | 84/01 | 89/61 | 94/57 | 99/53 | 104/49 | 109/45 | 114/41 | 119/37 | 124/33 | 129/29 | 134/25 |
| 3 | 3/02 | 8/62 | 13/58 | 18/54 | 23/50 | 28/46 | 33/42 | 38/38 | 43/34 | 48/30 | 53/26 | 58/22 | 63/18 | 68/14 | 73/10 | 78/06 | 83/02 | 88/62 | 93/58 | 98/54 | 103/50 | 108/46 | 113/42 | 118/38 | 123/34 | 128/30 | 133/26 |
| 4 | 2/03 | 7/63 | 12/59 | 17/55 | 22/51 | 27/47 | 32/43 | 37/39 | 42/35 | 47/31 | 52/27 | 57/23 | 62/19 | 67/15 | 72/11 | 77/07 | 82/03 | 87/63 | 92/59 | 97/55 | 102/51 | 107/47 | 112/43 | 117/39 | 122/35 | 127/31 | 132/27 |
| 5 | 1/04 | 6/00 | 11/60 | 16/56 | 21/52 | 26/48 | 31/44 | 36/40 | 41/36 | 46/32 | 51/28 | 56/24 | 61/20 | 66/16 | 71/12 | 76/08 | 81/04 | 86/00 | 91/60 | 96/56 | 101/52 | 106/48 | 111/44 | 116/40 | 121/36 | 126/32 | 131/28 |
| SCAN 2 | | | | | | | | | | | | | | | | | | | | | | | | | | | |
| 1 | 5/01 | | | | | | | | | | | | | | | | | | | | | | | | | | |
| 2 | 4/02 | | | | | | | | | | | | | | | | | | | | | | | | | | |
| 3 | 3/03 | | | | | | | | | | | | | | | | | | | | | | | | | | |
| 4 | 2/04 | | | | | | | | | | | | | | | | | | | | | | | | | | |
| 5 | 1/05 | | | | | | | | | | | | | | | | | | | | | | | | | | |
| SCAN 64 | | | | | | | | | | | | | | | | | | | | | | | | | | | |
| 1 | 5/63 | 10/59 | 15/55 | 20/51 | 5/47 | 30/43 | 35/39 | 40/35 | 45/31 | 50/27 | 55/23 | 60/19 | 65/15 | 70/11 | 75/07 | 80/03 | 85/63 | 90/59 | 95/55 | 100/51 | 105/47 | 110/43 | 115/39 | 120/35 | 125/31 | 130/27 | 135/23 |
| 2 | 4/00 | 9/60 | 14/56 | 19/52 | | | | | | | | | | | | | | | | | | | | | | | 134/24 |
| 3 | 3/01 | 8/61 | 13/57 | 18/53 | | | | | | | | | | | | | | | | | | | | | | | 133/25 |
| 4 | 2/02 | 7/62 | 12/58 | 17/54 | | | | | | | | | | | | | | | | | | | | | | | 132/26 |
| 5 | 1/03 | 6/63 | 11/59 | 16/55 | 21/51 | 26/47 | 31/43 | 36/39 | 40/35 | 46/31 | 51/27 | 56/23 | 61/19 | 66/15 | 71/11 | 76/07 | 81/03 | 86/63 | 91/59 | 96/55 | 101/51 | 106/47 | 111/43 | 116/39 | 121/35 | 126/31 | 131/27 |

| | | | | | | DUMMY SHIFTS |
|---|---|---|---|---|---|---|
| 20 | 16 | 12 | 08 | 04 | 00 | (6X-4)+1 |
| | | | | | 01 | (6X-4)+1 |
| | | | | | 02 | |
| | | | | | 03 | |
| | | | | | 04 | (6X-4)-4+1 |

HIGH SPEED PRINTER

Matter enclosed in heavy brackets [ ] appears in the original patent but forms no part of this reissue specification; matter printed in italics indicates the additions made by reissue.

CROSS REFERENCES TO RELATED APPLICATIONS

The following co-pending applications contain disclosure cross referenced herein:

Ser. No. (NO-101F) filed Sept. 12, 1969, entitled Hammer for Impact Printer, applicant Robert H. Curtiss et al.;

Ser. No. (NO-102F) filed Sept. 12, 1969, entitled Type Carrier, applicant Richard Holzman; and, Ser. No. (NO-103F) filed Sept. 12, 1969, entitled Transducer, applicant Robert H. Curtiss et al.

All of these applications are assigned to the assignee of this application.

BACKGROUND OF INVENTION

This invention relates to high speed printers and more particularly to such printers employing an endless type carrier coacting with a number of sets of hammers, one hammer for each character position in a line and a hammer driver for each set of hammers, the hammer driver being timed-shared among the hammers of a set.

Impact line printers are characterized by a moving endless print carrier having a number of characters etched, engraved, embossed or otherwise formed on or attached to the carrier surface. The character area of the carrier is designed for coacting with a print hammer at each character position on a line to effect printing on a print medium such as paper. Storage, control and timing circuitry are utilized to actuate a particular hammer at the precise time that a character desired to be printed at a character position is in registration with the position.

Both drum and endless chain printers are common in the prior art. Drum printers employ a drum with a matrix of print characters, constantly rotating about its horizontal axis, and having identical type characters in any particular row. Each column defines a complete type font.

Chain printers employ an endless band having affixed thereto individual type elements. The band moves horizontally across the print medium proximate to the line to be printed. Usually a number of type fonts are presented successively along the chain.

The human eye is sensitive to vertical misalignment but relatively insensitive to horizontal misregistration. Drum type printers are sensitive to vertical misalignment, expensive to manufacture, assemble and maintain.

In chain printers typically, links of the type elements readily loosen, and further the band will often stretch or buckle.

Hammer firing must be precisely timed in impact printers to prevent ghosting, smudging or misregistration of printed characters. Therefore, hammer drive circuits must deliver extremely accurate actuation pulses, precise in rise time, duration and magnitude. Further, such pulses be most accurately timed to actuate the hammer exactly when printing is required.

The type of hammer which generally has been used is an electromagnetically operated device which is normally in a rest position and upon the receipt of an actuation pulse is moved from rest to a position of impact. The hammer forces the paper and type ribbon against the type character. High power levels are necessary to impart energy to the hammer during a substantial portion of hammer flight time.

If the printer is to operate at speeds compatible with contemporary computers, a number of hammers must be fired simultaneously or in rapid succession. This requires power supplies having high energy storage and quick recovery time. Such supplies are extremely costly, large and heavy.

Numerous attempts have been made to reduce the cost of printers by time-sharing hammers and/or hammer drive circuits. However, these attempts have resulted in a decrease in speed of operation, an increase in the capacity of the power supply and an increase in the complexity and capacity of the control, timing and storage circuitry.

For example, if hammer drivers are time-shared, once the drivers have been gated to fire at certain character positions, and complete their firing cycle, other characters to be printed have already passed their character position and printing must await the next appearance of the character. If four hammers share a single driver, four cycles of type font may occur before completing a line of type.

In some prior art systems, the type font has been displaced slightly so that characters arrive at various positions in timed sequence. However, hammer actuation pulses must be delivered so rapidly and have such high energy levels, that power supplies must be very large to recharge in time for the next firing cycle, heat dissipation and burn out becomes a problem, and false actuation of hammers often occurs.

Other systems have included shifting type bars, shifting paper carriers and like mechanical systems. These arrangements are limited by the low speed of operation of the mechanical devices employed.

SUMMARY OF INVENTION

The present invention provides the advantages of high-speed, reduced size and cost of an impact printer without suffering from the disadvantages mentioned supra and other disadvantages of prior art devices.

An object of the invention is to provide an improved printer.

A further object is to provide an improved printer employing fewer drive circuits than prior art printers while maintaining and minimizing the total time for a printing cycle.

Yet another object is to provide such a printer with a decrease in power supply requirements.

A further object is to provide an improved printer while decreasing the size and reducing the cost of the system.

The invention features a high speed line printer with reduced complexity, particularly in the area of the hammer drive and control circuitry. To this end a novel combination of elements is employed, while effecting substantial reductions in cost, size and power requirements as well as substantial increases in reliability. At the same time, the speed of operation and print quality of prior art devices are maintained. This is accomplished by a unique combination of type carrier, hammers, and hammer drive control and time circuits. The type carrier is constantly moving and characters thereon are spaced from one another a distance greater than the spacing between character positions on the print medium. The print hammers are magnetically restrained in the cocked position by a permanent magnet opposing a mechanical bias. This bias, upon release, causes the hammers to impact the print medium and effects printing by co-action between the print medium and the type characters on the font belt. Thus, the energy to drive the hammers is in the nature of kinetic energy stored when the hammers are cocked rather than energy transferred from drive pulses as in the case of solenoid operated hammers. Therefore, the hammers are released by low energy, extremely short duration current pulses which set up magnetic fields in opposition to the fields caused by the permanent magnet, releasing the hammers into flight. The pulse time is a fraction of hammer flight time.

Since the hammer driver pulses may be short in duration and of low energy, hammer drivers may be time-shared by a number of hammers in a time sequence equivalent to the sequential registration of type characters on the band with characters positions, thereby substantially reducing the total number of drivers necessary to fire the hammers.

DISCLOSURE OF PREFERRED EMBODIMENTS

Other objects, features and advantages will occur from the following description of preferred embodiments and the accompanying drawings, in which:

FIG. 3a is a partial front view of a type carrier, print medium and hammers employed in the printer system of FIG. 2;

FIG. 3b shows in schematic form the relative movement of the type band and character position during a number of subscans;

FIG. 4 shows a portion of a few of the hammers and a portion of the permanent magnet associated with the hammers;

Figure 2:
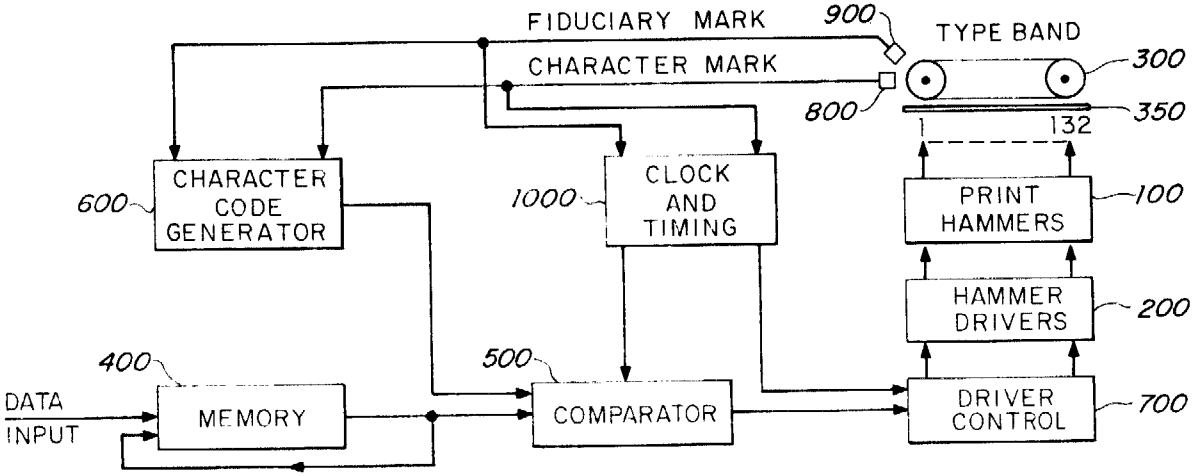
FIG. 2 is a general block diagram of a printer system in accordance with the invention.
Figure 5A:
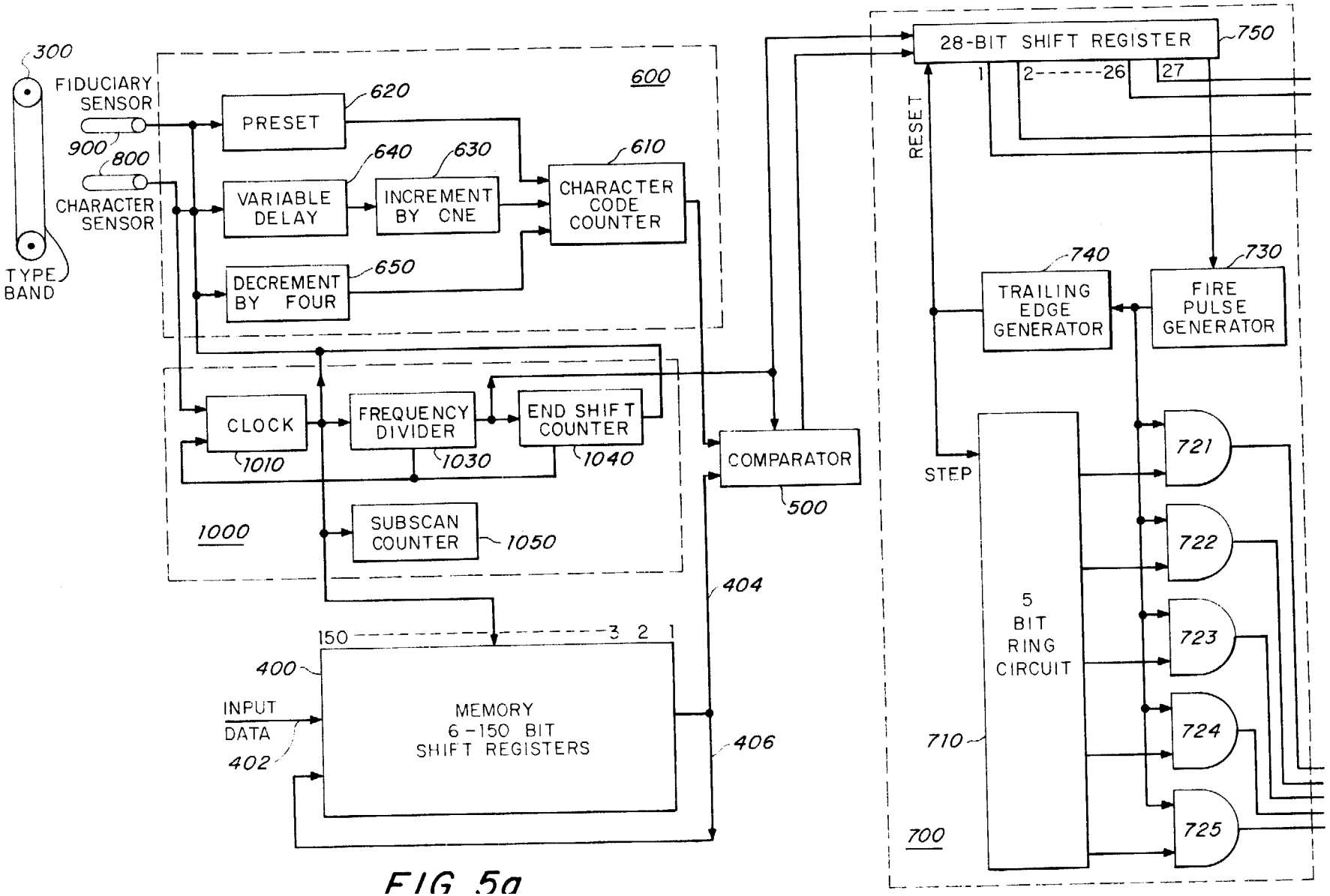
Figure 5B:
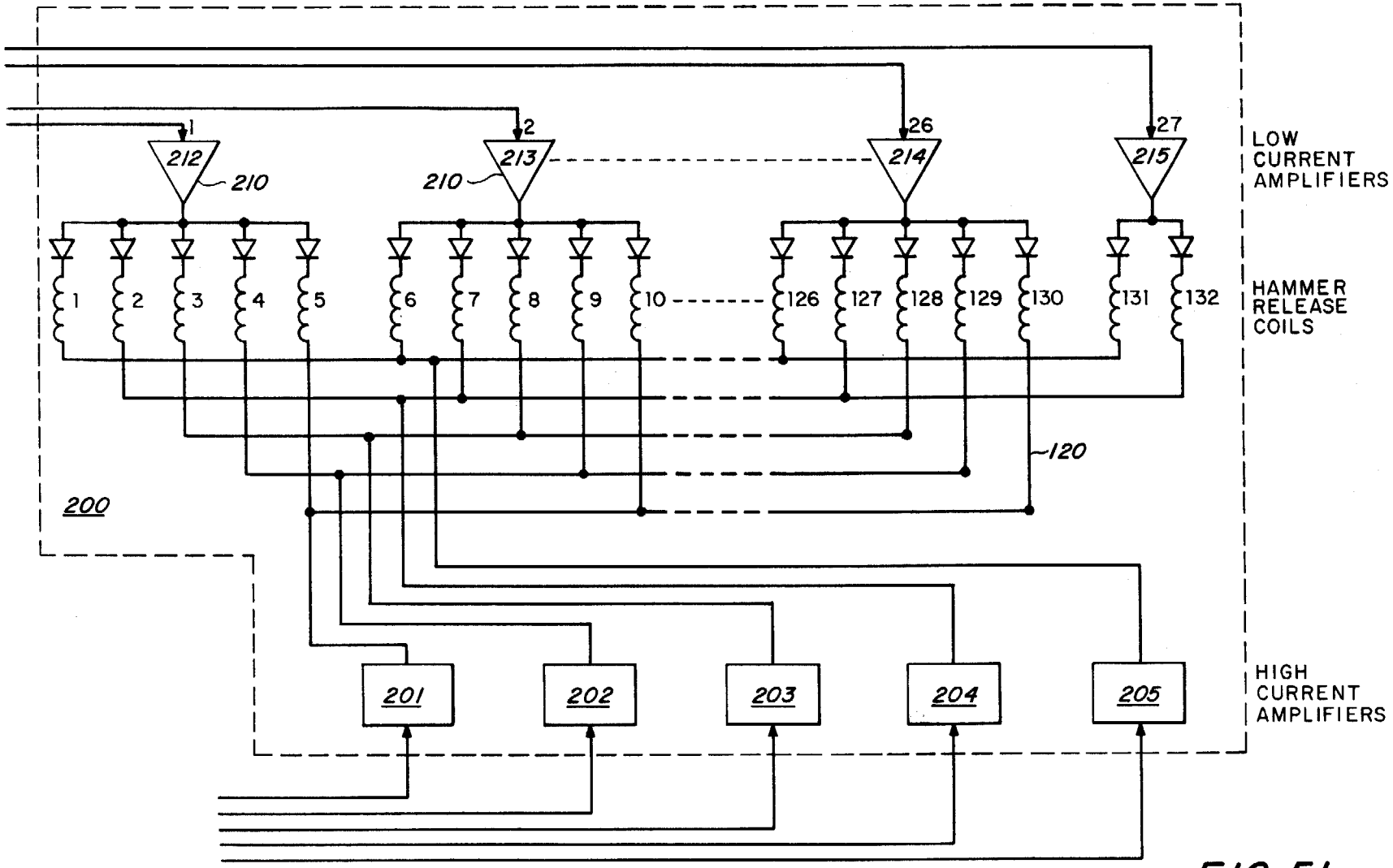
Figures 6A, 6B:
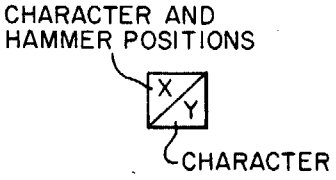
Figure 7:
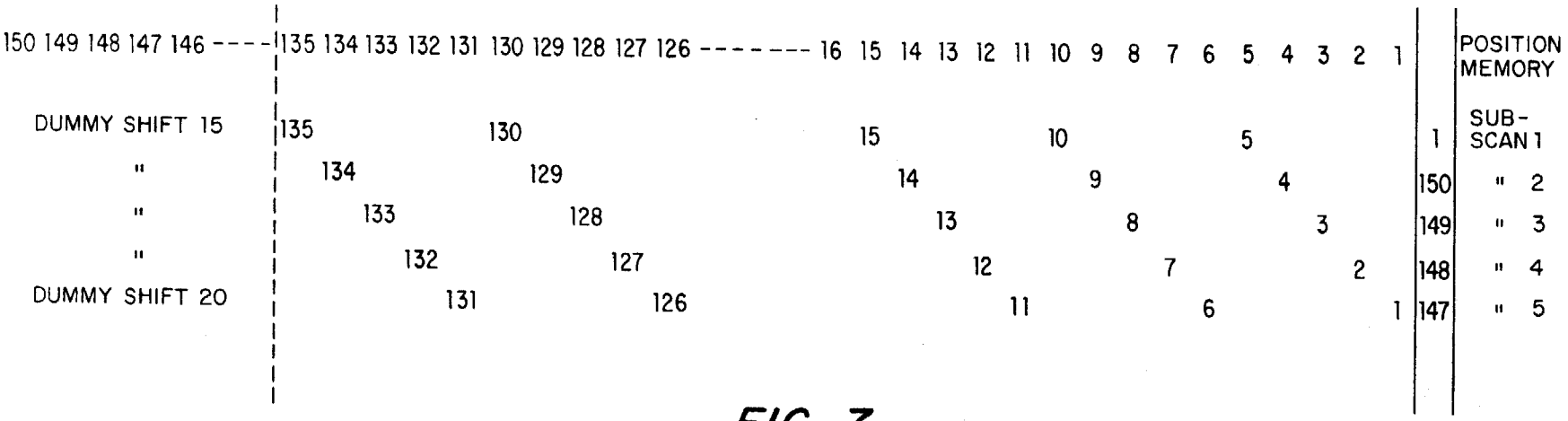
Figure 8:
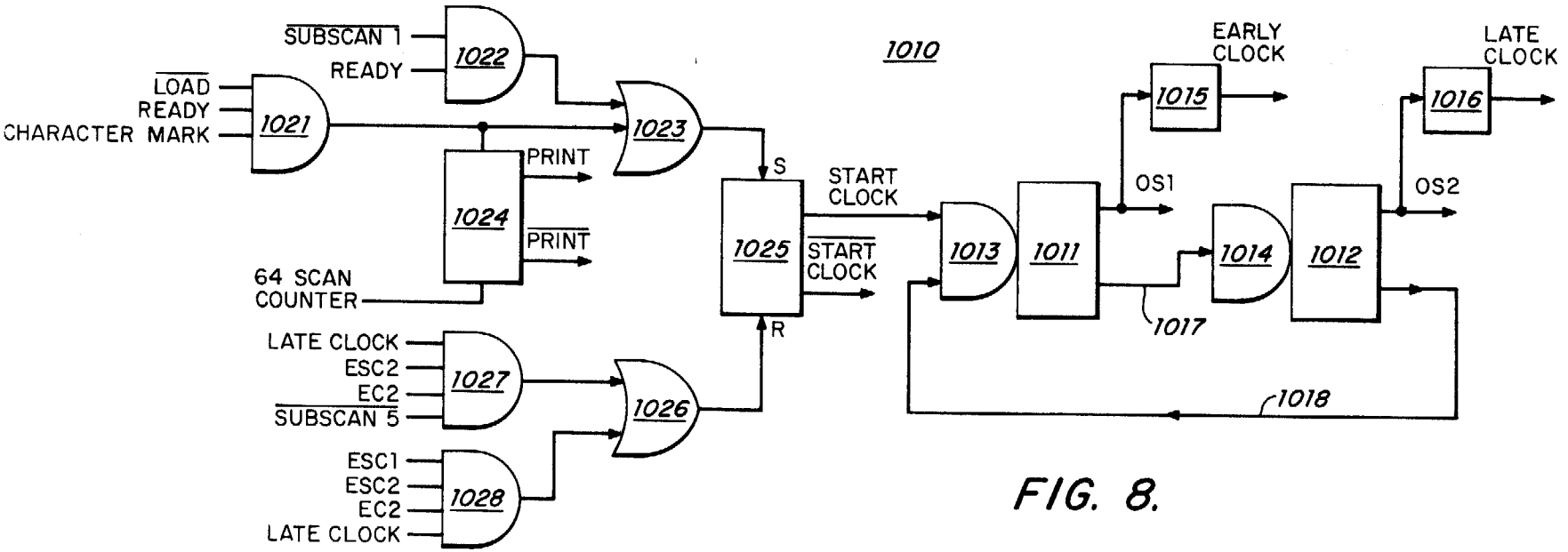
Figure 13:
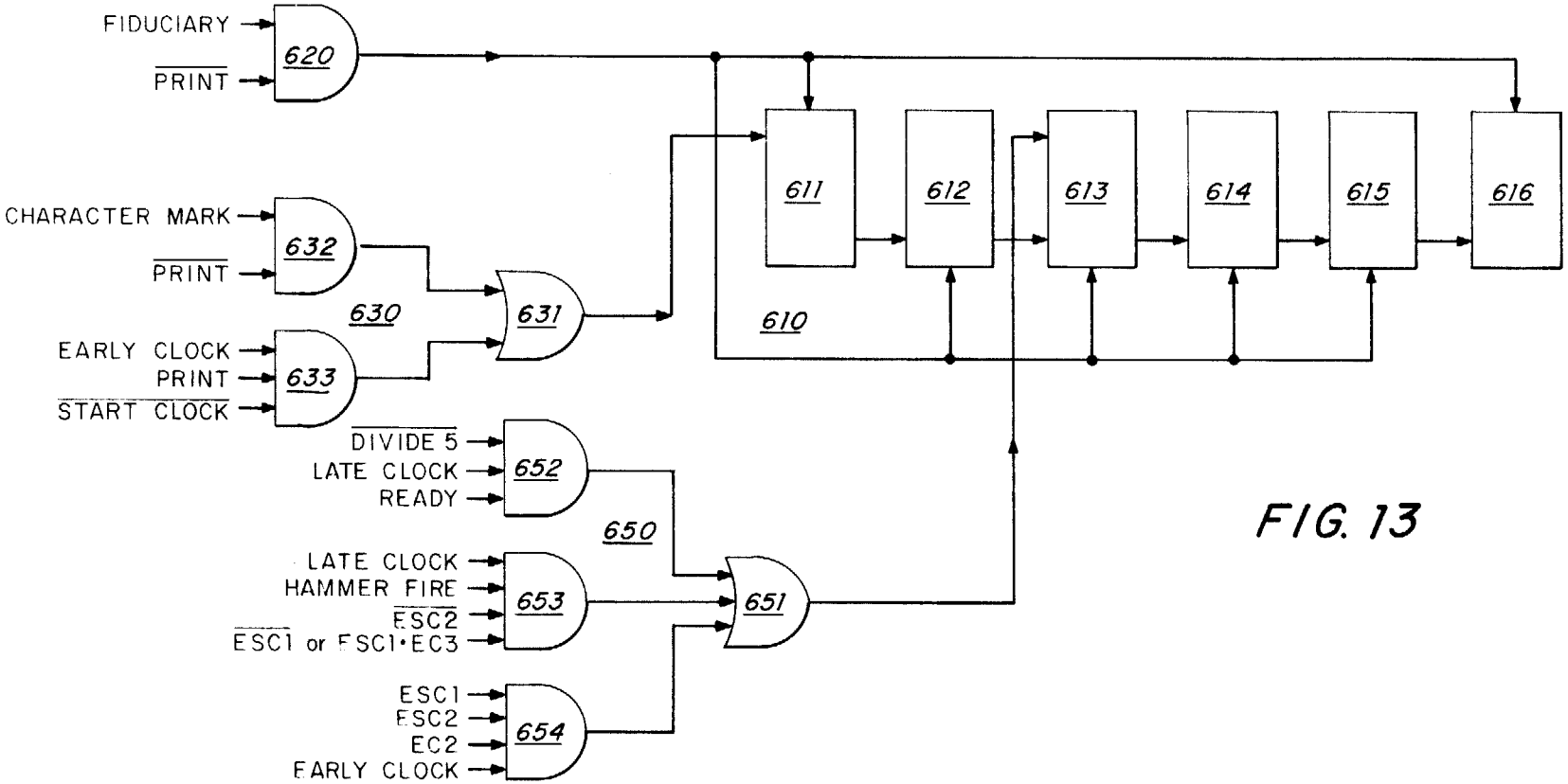
Figure 9:
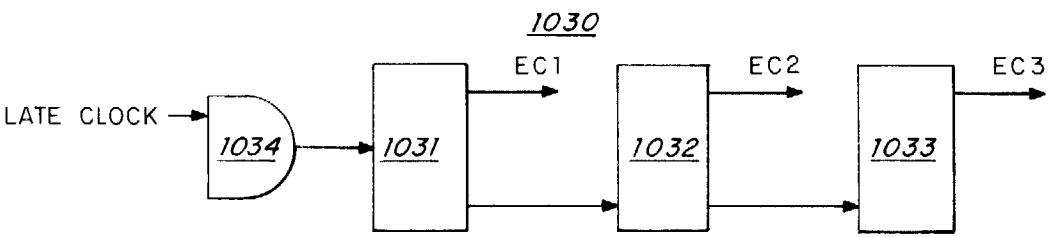
Figure 12:
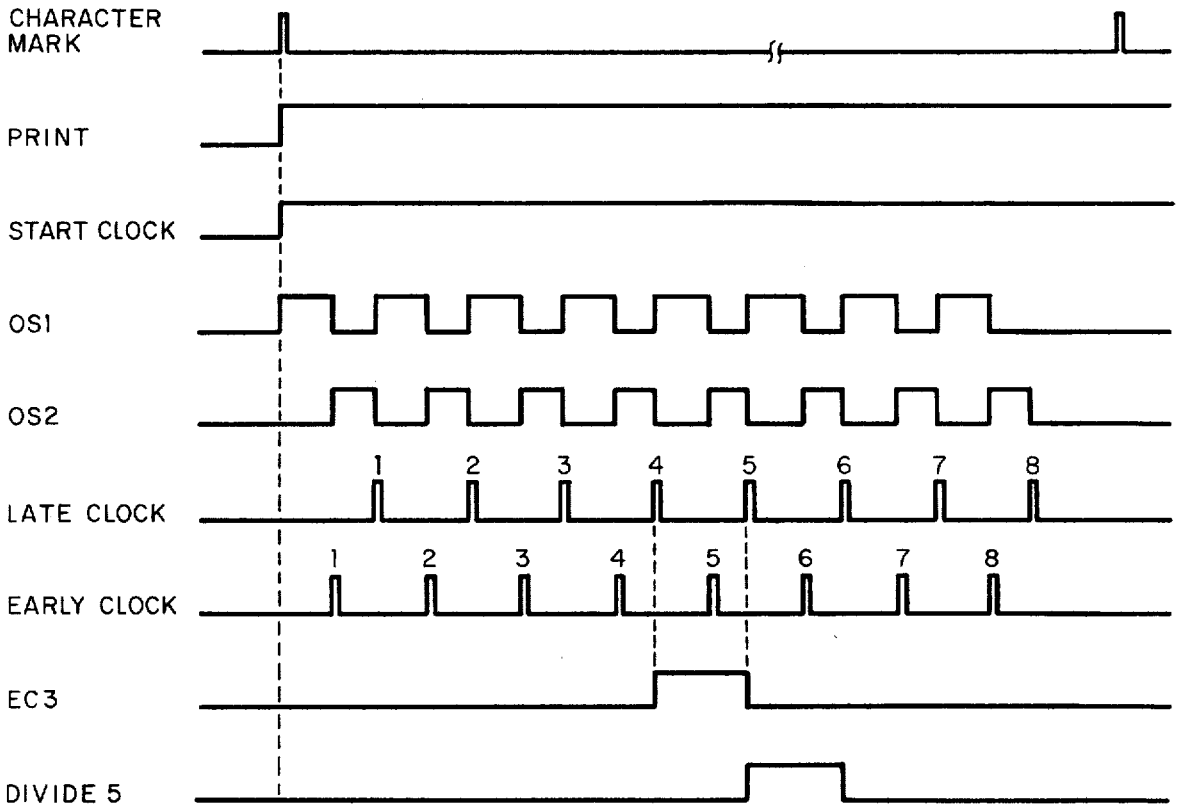
Figure 11:
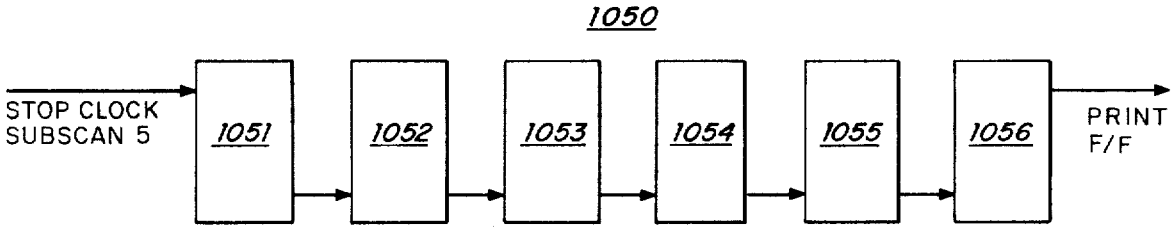
Figure 10:
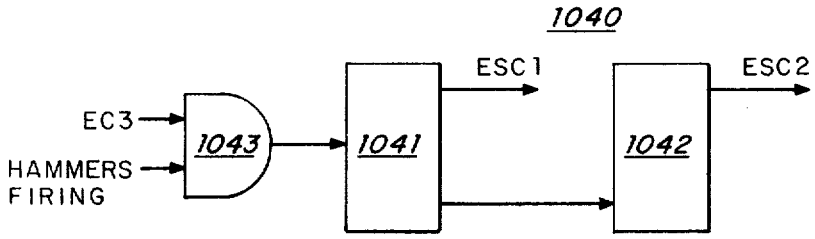

FIGS. 5a and 5b together show a more detailed block diagram of the embodiment of FIG. 2;

FIG. 6a is a chart showing the contents of the character code counter during various scans and subscans of the print phase;

FIG. 6b depicts the meaning of the chart of FIG. 6a;

FIG. 7 is a chart depicting the shifting of data in the memory during any single scan of the print phase;

FIG. 8 is a logic diagram of the clock circuit and associated logic;

FIG. 9 is a logic diagram of the frequency divider;

FIG. 10 is a logic diagram of the end shift circuit;

FIG. 11 is a logic diagram of the scan counter;

FIG. 12 is a timing diagram showing the relationship of various pulses developed in the circuits of FIGS. 8 to 11;

FIG. 13 is a logic diagram of the character code generator.

Figure 14:
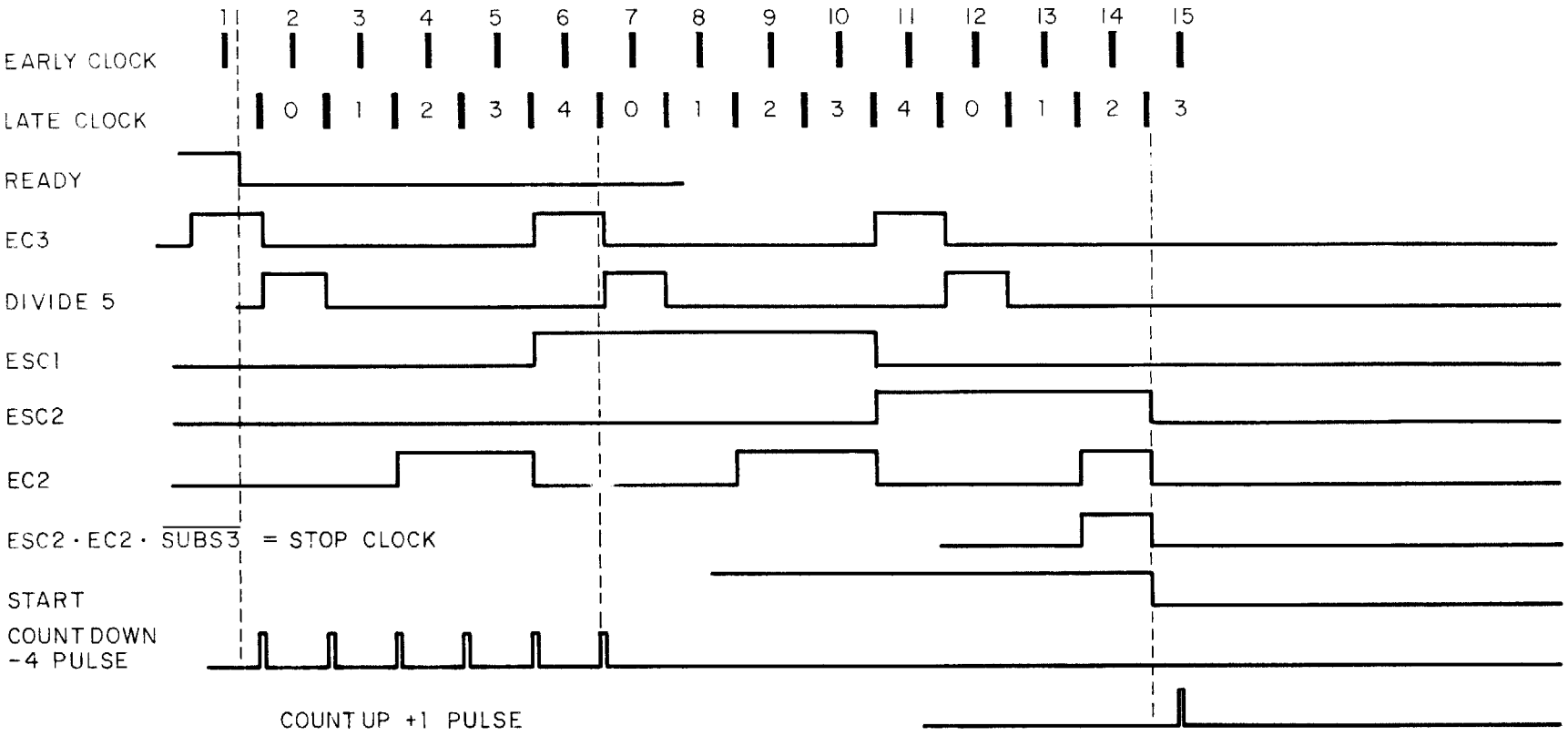
Figure 15:
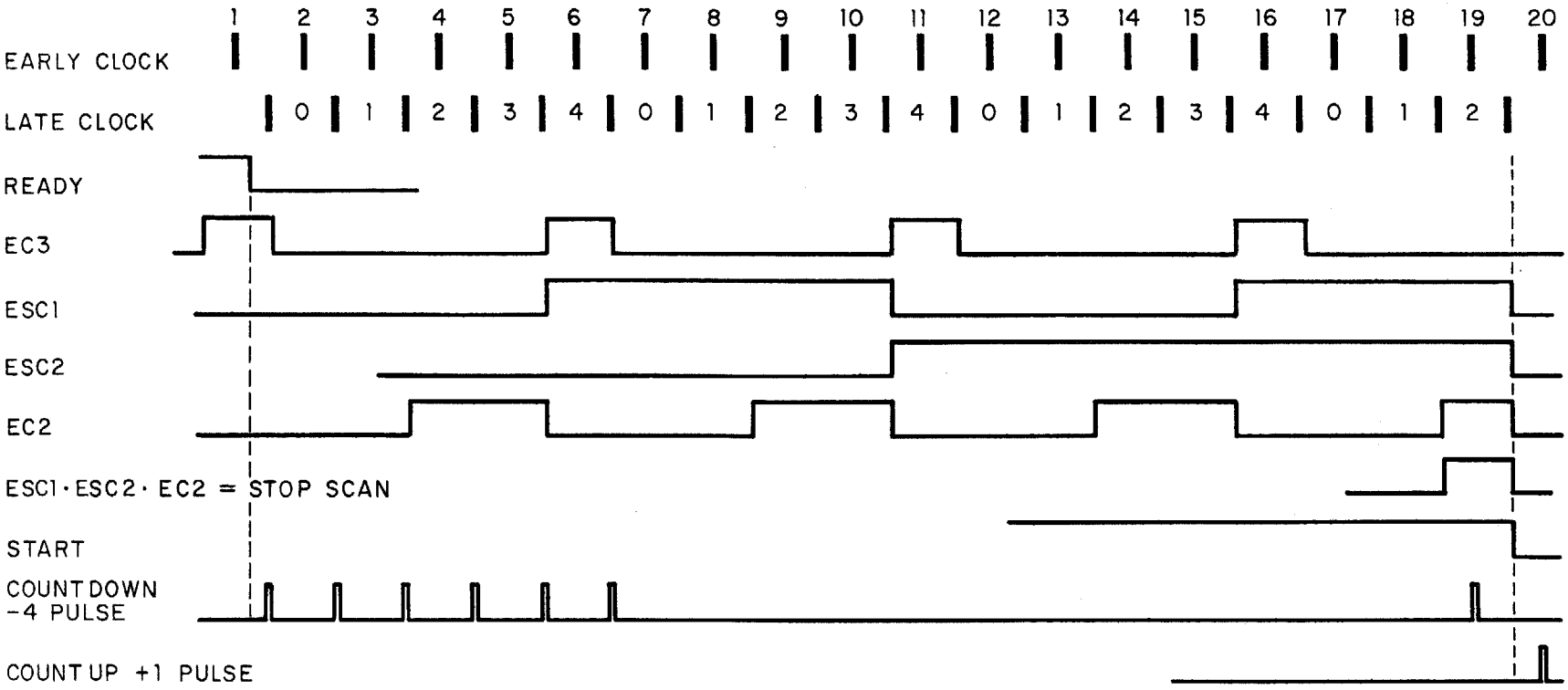

FIG. 14 is a diagram illustrating the timing of various pulses of FIGS. 8 to 11 and 13, after completion of subscans 1 to 4; and, FIG. 15 is a diagram illustrating the timing of various pulses of FIGS. 8 to 11 and 13, after completion of subscan 5.

A printer system has three functional phases or cycles of operation: data load; print; and bail and paper feed. During the data load phase, the data desired to be printed on a single line is fed into a buffer memory from the data source. During the print phase, printing occurs. During the bail and paper feed phase, the paper and ribbon are advanced and the print hammers are bailed or cocked. Both the data load and bail and paper feed phases may be accomplished simultaneously. Since the data load, and bail and paper feed phases form no part of the inventive concept, no additional mention of either phase is made herein.

Figure 1:
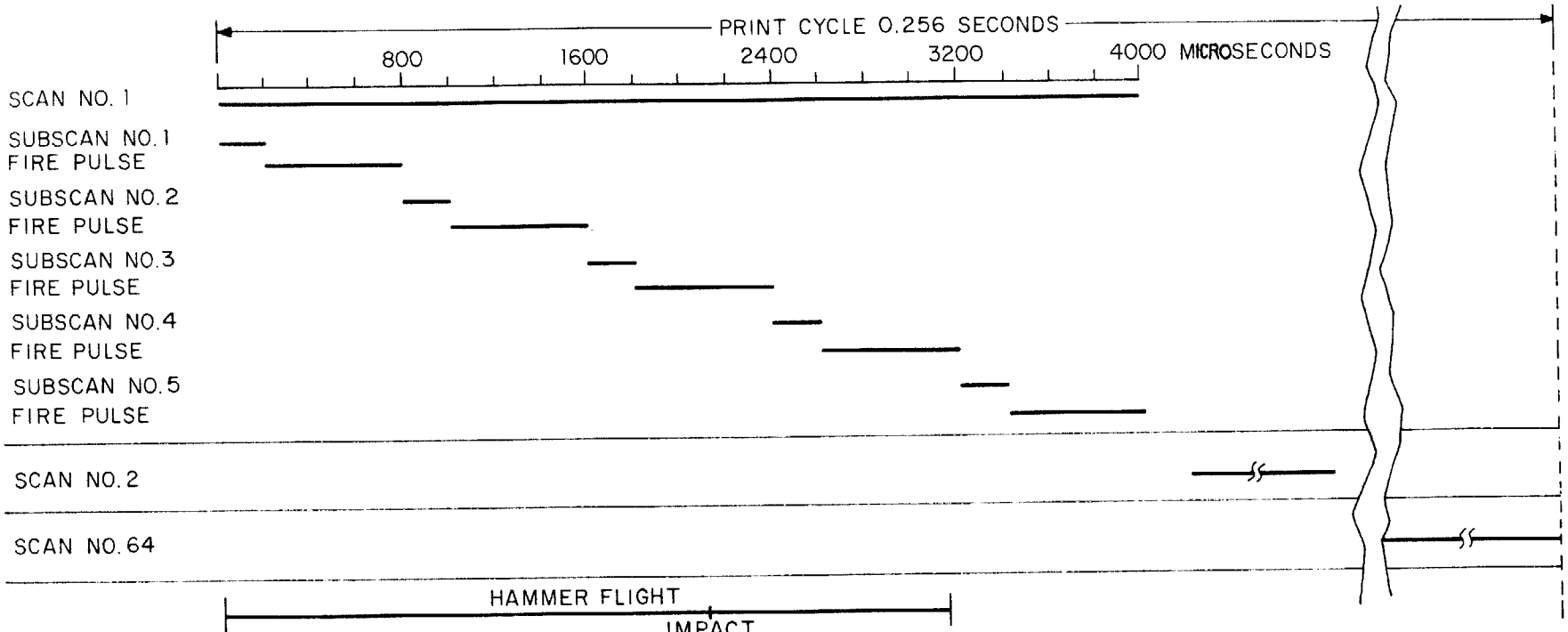
FIG. 1 is a chart depicting timing of major events in a print cycle.

A print phase, FIG. 1, is 0.256 seconds in duration and consists of 64 scans; each scan is approximately 4 milliseconds. During each scan, five subscans of 200 microseconds are completed. Each subscan is followed by a 600 microsecond firing pulse period.

Type characters on the carrier are staggered relative to character position such that during the firing pulse period following any particular subscan, only one-fifth of the type characters on the band are in registration with particular character positions on the print media. The subscan is the time period used for comparison of particular type character codes, hereinafter referred to as character codes, those in registration during the succeeding firing pulse period, with codes indicative of characters desired to be printed in these positions, hereinafter referred to as data codes. Hence, during any one scan, five subscans, a character code is compared to the data code for each position. The type font employed in this embodiment is a 64 character code. Thus, 64 scans are necessary to compare each character code in a font with the data code for each character position.

Hammer flight time is also shown in FIG. 1, the time from release of the hammer from the cocked position to impact on the paper and rebound to a rest position. This time is approximately 3 milliseconds or one-fourth of a complete scan. It is seen from FIG. 1 that a subscan begins long before hammers released by prior firing pulses come to rest.

Typically, in prior art printers, hammer firing pulses must be of a duration of approximately 1,300 miliseconds, in excess of twice as long as firing pulses utilized in the present invention. Because of the short pulse duration of the pulse used in the invention system, drivers may be time shared effectively and efficiently.

FIG. 2 depicts a functional block diagram of a printer embodiment utilizing the present invention. 132 print hammers 100, one for each character position in a line of print on a print carrier medium such as paper 350, time-share a set of 27 hammer drivers or hammer release means 200. The hammers coact with a moving type carrier or type band and an inked type ribbon, not shown in the interests of clarity, to produce a line of print. Data to be printed is fed into a regenerative memory 400 from a data source such as a computer, not shown, which memory feeds a comparator 500. A character code generator 600 also feeds comparator 500, the output of which is fed to driver control circuit 700. Marks on the band 300 are sensed by sensors 800 and 900, the output of which feed clock and timing circuitry 1000 and character code generator 600.

A line of print consists of 132 character positions, each character position has an associated hammer and every set of five hammers has an associated one of 27 hammer drive circuits. The last set has only two hammers. The type band has six 64 character type fonts, actually 63 characters and one space, a character mark associated with each character and the space, and a fiduciary or font mark associated with each of the six fonts.

A print phase, the time necessary to complete one line of print, is equal to the amount of time it takes a complete type font to pass a character position.

During each subscan, FIG. 1, the data code representing the character to be printed, stored in memory 400, is compared in comparator 500 to a character code generated by the character code generator 600. The character code specifies the type character present at that position during the following firing period. When a match, a favorable comparison, or mismatch, unfavorable comparison, occurs; indications of either condition are stored in the control circuits 700. During a subscan, 27 comparisons are made, followed by the generation of fire pulses by the drivers 200 then connected to the hammers corresponding to character positions where a match occurred.

The fire pulse duration, FIG. 1, is less than one quarter of the average hammer flight time. Hence, almost three subscans are completed prior to completion of flight of hammers set in motion during preceding fire pulse periods.

During the first subscan, the data code representing characters to be printed in character positions 5, 10, 15 . . . 130 is compared to the character code indicative of type character arriving at these positions, and each of the 27 driver circuits 200 are connected to each of the hammers 100 corresponding to those positions. Only those drivers associated with a match are enabled by the control circuits 700 during a firing period to follow any particular subscan.

During the second subscan, the data code for data to be printed in character positions 4, 9, 14 . . . 129 is compared to the character code for type characters arriving thereat during the associated firing period. In like manner, during subscans 3, 4 and 5, the remaining character codes are compared to the data codes to be printed. Thus, the 27 drivers 200 are time shared.

Timing initiation results from a character mark on the band being sensed by character sensor 800 and synchronization, by a pulse sensed by fiduciary sensor 900. The pulse starts the clock 1000. Synchronization occurs at the start of each of of the sixty-four scans or cycles. During the load and bailing and paper feed phases, the character code generator 600 is set by the receipt of a fiduciary mark signal from sensor 900 and is stepped by a count of one by the receipt of each character mark from sensor 800 thereafter, so that scanning may begin immediately at the commencement of a scanning cycle. If the generator 600 were not kept current with movement of the band, the print phase might be delayed by as mush as 0.256 seconds, the time for movement of a complete font of type on the band past any particular point.

The type band 300, FIG. 3a, has a row of type characters 302, a row of character marks 304, and a row of fiduciary or "start of font" marks 306 formed thereon. A suitable type band is described in copending application Ser. No. 857,507, now abandoned, (NO-102F) filed Sept. 12, 1969, entitled Type Carrier, invented by Richard Holzman and having a common assignee with the present application. In line with the band is a sector of the paper 350 to be printed upon. The rectangles 351 through 355, shown on the paper designate character positions on the paper. Faces of a few of the print hammers 100 are shown which impact the paper 350 and a ribbon (not shown) forcing paper and ribbon against the band to effct printing. The linear distance between character positions 302 and corresponding hammer positions differs from the distance between type characters 302 on the band 300.

For each five character positions only four type characters appear. FIG. 3b is a schematic representation showing character positions 352 on the print medium 350 and the type characters 302 on the band 300 moving from left to right during six successive subscans. In the firing pulse period immediately following subscan 1, type character 302, "D" is in registration with character position 5. Likewise, type characters are in registration with positions 10, 15 . . . 125 and 130 during this subscan. The other character positions do not have type characters in registration at this time. During the firing period following subscan 2, type characters 302 are in registration with character positions 4, 9, 14, 19 . . . 129 represented by type character "C" in position 4.

In a similar manner, type characters come into register with each set of 27 character positions during one subscan. After one complete scan, subscan 1 of scan 2, the next type character in this instance "C" is in registration with position 5. Thus, during any particular scan a different one of the 64 characters on the band is in registration with each character position, one-fifth of the characters, during any subscan.

In the embodiment shown, a unit distance is the distance between each five character position centers. Four type characters occupy this distance. Thus, each character position is spaced X/5. Each type character is spaced by a distance X/4 from the next and the relative spacing is $(X/4)/(X/5)=4/5$. If each five character positions occupy 0.500 inches, the distance between positions is 0.100 inches; and, each four characters occupy 0.500 inches, the distance between each character is 0.125 inches. Hence the distance that the belt must travel between successive subscans is only $0.125-0.100=0.025$ inches. The belt 300 is timed to move this distance every 800 microseconds, the time between successive subscans. The phase-shift between type characters 302 and positions 352 is commonly designated in the art as "doppler." The particular shift described herein is a "4 out of 5 doppler." Four type characters 302 appear for each five character positions.

It has been found that hammers which are held in a cocked position biased to naturally impact the paper upon release and thereafter settle in a rest position between the impact and cocked positions are most desirable in the practice of the present invention. Release of the hammers may be effected by a short duration, low energy, electrical pulse with relatively wide limitations on rise time and other parameters. By employing this type of hammer, rather than the type mentioned supra in the discussion of the prior art, simplification of the drive circuitry, reduction in size of the power supply, and the ability to time-share drivers without a loss in speed of operation are effected. The usual hammer utilized in high speed printers is solenoid actuated requiring a drive pulse of long duration and high energy which pulse must be extremely precise in all parameters. A suitable hammer for use in the present invention is disclosed in copending application Ser. No. 854,531 (NO-101F) filed Sept. 2, 1969, entitled Hammer for Impact Printer by Robert H. Curtiss, et al., and assigned to the assignee of this application.

Print hammers 100, FIG. 4, are magnetically held in a cocked position by a permanent magnet 110, and are released into flight by a low energy, short duration current supplied by hammer drivers 200, FIG. 2, to coils 120 which surround each magnet. This current opposes the magnetic force holding the hammers in place. The hammers 110 are biased by springs 130 to release, impact the paper and force the paper and ribbon (not shown) against the band 300 to print. The hammers 100 rebounding from the paper are damped by a mass 140 which they strike, to prevent ghosting. The hammers 100 come to rest in a position as shown, between the magnetic circuit and the paper. Thus, energy is stored in the hammers 100 while the cocked position to move the hammers rather than supplied by the driver pulse current. The current merely is sufficient to release the hammers.

A suitable type of sensing device for both character mark sensor 800 and fiduciary mark sensor 900 is described in copending patent application Ser. No. 857,506 (NO-103F) filed Sept. 12, 1969, entitled Transducer invented by Robert H. Curtiss and assigned to the assignee of the present invention. Although magnetic sensing of marks is employed in the embodiment shown, it is well within the purview of these skilled in the art to use other sensing systems such as photo-optical sensing.

Each of the characters appearing on the band 300 is designated by a six-bit binary code which code set has been derived from the seven-bit American Standard Code for Information Interchange.

The hammer drive circuits 200, FIG. 5, consist of five high current amplifiers, 201 to 205. Each amplifier is connected to every fifth hammer release coil. High current amplifier 201 is connected to release coils corresponding to character positions and hammers 5, 10, 15 . . . 130. Amplifier 202 is connected to coils in positions 4, 9, 14 . . . 129 and amplifier 205 is connected to coils in positions 1, 6, 11 . . . 126 and 131. The other ends of the hammer release coils are connected to a set of 27 low current amplifiers 210. These amplifiers are each connected to five hammer release coils in sequence. Thus low current amplifier 212 is connected to coils in positions 1, 2, 3, 4 and 5; amplifier 213 is connected to coils in positions 6, 7, 8, 9, and 10; amplifier 214, the 26th amplifier, is connected to coils in positions 126, 127, 128, 129 and 130 and amplifier 215, the 27th, is connected to coils in positions 131 and 132. Not all of the amplifiers 210 and hammer release coils 120 are shown. Each coil 120 has a series diode 121 to prevent the completion of an unwanted current path between adjacent coils.

The hammers 100 are not shown in FIG. 5, but have been described in conjunction with FIG. 4. The numbers 1 to 132 associate with the coils corresponding to character positions.

The memory 400 consists of six 150-bit position shift registers. Input from a data source is via input data lines 402 and output 404 is connected to comparator 500. The memory is regenerative, that is, the output from position 1 is fed back to the input position 150 via feedback lines 406.

The character code generator 600 has a character counter 610 fed by a preset circuit 620, an increment-by-one/circuit 630 fed by a variable delay circuit 640, and a decrement-by-four circuit 650.

The driver control circuits consist of a five-bit ring counter circuit 710, five AND gates 721 to 725, a fire pulse generator 730 feeding the gates, which also feeds a trailing edge detector 740 and a 28-bit shift register 750.

The clock and timing circuits 1000, are fed by character mark sensor 800 and fiduciary sensor 900. The circuits are a clock circuit 1010, a frequency divider 1030, which produces a pulse for every fifth clock pulse, and end shift counter 1040 and a subscan counter 1050. Clock and timing pulses are fed throughout the printer system.

The band is moving during all phases of printer operation. Prior to commencement of the printing phase the character code counter 610 is preset by preset circuit 620 to a predetermined binary count, 100001, the code for the type character "A," each time that a fiduciary mark 306, FIG. 3, is sensed by fiduciary sensor 900. Thereafter, each time a character mark 304 is sensed by character sensor 800, the counter 610 is incremented by a count of "1" by increment-by-one circuitry 630. As soon as a print cycle begins, the character counter 610 contains the proper count and it is not necessary to wait for a fiduciary mark to appear at a particular character position to set the counter. Thus it is not necessary to await the beginning of a font to start printing. Printing may start with the band 300 in any position.

It takes approximately one-quarter of a second for the band 300 to move a complete font past a character position. Had the counter not been preset by the previous mark 306 as much as one-quarter of a second delay might be incurred at the beginning of a print phase. Further, the counter 610 is reset by a pulse from sensor 900 initiated by each fiduciary mark 306. This way slight variations in belt speed do not generate cumulative errors. Data in parallel is loaded into shift registers of memory 400. The data code for the character to be printed in character position 1, normally occupying the right most position of the shift registers, enters position 150 of the shift registers, the left most position, and is shifted to position 1 by subseqent data entry. Prior to the start of a scan, the contents of the 28 bit shaft register 750 has been "dumped" and the register was reset to all zeros, but for the first position in which a one was set. When the memory 400 is fully loaded, the data code indicative of a character to be printed in character position one is in storage cell one of the memory shift registers. Once the load cycle is completed and other conditions are present, power is controlled, hammers are cocked, and the like, the first scan begins with subscan 1. The next character mark sensed by sensor 800 is gated to clock circuit 1010 and trains of clock pulses are generated by the clock 1010.

In response to the clock pulses the data memory is shifted four positions and the data clock indicative of the desired character to be printed in character position 5 appears at the comparator 500. Simultaneously, the decrement-by-four circuit 650 causes the character code counter to decrement by four, indicative of the type character 302, FIG. 3, on band 300 about to be in registration with character position five 352. If a favorable comparison results, a match signal is stored in position one of the shift register, shifting the 1 previously stored therein to position two. If an unfavorable comparison occurs, a zero is stored in shift register position 1 again shifting the 1 therein to position 2.

The memory is shifted by five clock pulses; the data code to be printed in character position 10 is gated to the comparator 500 and the character counter 610 is decremented by a count of four. This character code is also gated to the comparator 500. Again, if a match occurs, a one is loaded into position one of the shift register 750, shifting the previously stored levels each one position. This shifting of the memory 400 content, and stepping of the character code counter 610 continues until the 27th comparison has been made. When the result of this comparison is loaded into the 28 bit shift register 750 and the original "one" set therein prior to the commencement of this subscan arrives in cell 28 of the register an "initiate fire pulse" signal is transmitted to the fire pulse generator 730. Twenty-seven comparisons take approximately 200 microseconds, FIG. 1.

The five-bit ring circuit 710 previously set to its first position enables the first AND gate 721 to pass the fire pulse from generator 730 to high current amplifier 201. This completes a circuit consisting of high current amplifier 201, those of coils 5 10, 15, 20 . . . 130 and low current amplifiers 1 to 27 connected to shift register 750 storage cells having a "one" level indicative of a match stored therein. The fire pulses travel through the designated coils and associated diodes, release the respective hammers and cause the hammers to force the paper against the character band at those positions where a character is to be printed. The first pulse is approximately 600 microseconds in duration, FIG. 1. The trailing edge of the fire pulse activates trailing edge sensor 740 which emits a pulse, resetting the 28-bit shift register to the predetermined code, a one in position 1 and zeros in positions 2 to 28. The trailing edge pulse also steps the five-bit ring counter to a count of two, subscan 2.

During the firing pulse period, the character counter 610 executes six decrement-by-four operations and upon sensing of the next character mark executes an increment-by-one operation, advancing the counter by a count one greater than that contained therein at the start of subscan 1.

Thus the code generator contains the character code for the type character appearing on the belt subscan 2, FIG. 3b, in registration with the next position. The total time for a subscan and a firing subcycle is about 800 microseconds; FIG. 1, 200 microseconds for the subscan and 600 microseconds of firing time. 800 microseconds is precisely the time it takes the band to move 0.025 inches, the distance that type characters are displaced from character positions.

The character which had been slightly displaced from character position four, FIG. 3b, is now in alignment with character position four. Similarly, type characters are aligned with positions 9, 14 . . . 129.

Subscans 2 through 5 occur in the same manner, with the following exception. At the end of subscan 5, an extra decrement-by-four operation is performed and the character counter now contains the code for the next character to appear in registration with position 5, FIG. 3b. Thus scan number two is commenced.

It is of particular interest to note, FIG. 1, that each fire pulse is 600 microseconds in duration, yet hammer flight time is approximately 3,000 microseconds. Thus, after a subscan, the 600 microsecond fire pulse interval occurs, the next three 200 microsecond subscans are accomplished and the third firing pulse is almost completed before the hammers fired in subcycle 1 come to rest. It is seen that the drivers are time-shared, switching from one hammerin a set to other hammers in a set during the flight of the initial 27 hammers.

Scans two to sixty-four proceed in the same manner.

The decimal equivalents of the character codes as they appear in character counter 610, FIG. 5, are shown in FIG. 6a. The top most column depicts the comparisons, columns 1 to 27, made during the subscan and dummy shifts executed by the counter during the firing pulse period following a subscan. The dummy shifts are executed so that the counter may be set to the proper character code when the next successive subscan begins.

FIG. 6b depicts the meaning of the numbers within a block of FIG. 6a. The number to the left of the slash indicates the character position at which a character will appear. And the number to the right is the decimal equivalent of the binary character code assigned to that particular character.

Codes are assigned from 00 to 64 in sequence with characters on the band. The code following 64 is 00.

Assume that during the first subscan the band 300 is positioned such that the character "space" is in registration with character position 5. During this subscan, character codes and data codes for position 5, 10, 15 . . . 125 and 130 are compared. Thus during the first comparison of this subscan, the code for a space, 00, is compared to the data code in memory for position 5. The character appearing in registration with position 10 with be spaced four characters on the band 300, FIG. 3b, from the space and is represented by a code having a decimal equivalent four numbers less than 00, which code is 60. Similarly the character code representing the type character in registration with position 15 will be four characters distant from the preceding type character which was compared, and will be represented by the character code 56. Thus each successive character code of the 27 presented during any one subscan is four less than the immediately preceeding code. During subscan 2, the character on the belt adjacent to the space will be in registration with character position 4. This character is an "!" and is represented by the character code 01. Hence during the firing pulse period between subscans 1 and 2, the counter 610 must be shifted so that at the start of subscan 2 the appropriate character code will be set therein.

At the 27th comparison of subscan 1 the code 24 is set into the counter. The counter must be decremented by a count of 23 so that the counter 610 contains the count 01 at the start of subscan 2. This is accomplished by decrementing the counter six times by a count of four, a count of 24, and incrementing by a count of one, for a total change in count of −23. The process for changing the count during the firing period is referred to as a dummy shift.

Following subscan 5, a new scan is started. Since a type character 302 on band 300, FIG. 3b, has moved one complete character position, the type character now in registration with position five is represented by a character code value one more than the value of the character in registration at the start of scan 1. Therefore, the character code 28 contained in counter 610 must be decremented by 27 to arrive at the correct count following subscan 5. This is accomplished by executing a decrement-by-four six times, performing an additional decrement-by-four, and then incrementing-by-one.

The count contained in counter 610 for a portion of the 64th scan is also shown in FIG. 6a.

As the counter 610 is changing character codes, memory 400 shift registers will be presenting data codes indicative of the data to be printed in various character positions, such that the data codes and character codes arrive at comparator 500, FIG. 5, in timed sequence.

The data code in position one of the memory 400 shift register is shown in the rightmost columns of FIG. 7. Clock pulse from clock 1010, FIG. 5, shift the content of the registers from position to position. Each fifth data code is gated to comparator 500 which comparator is enabled by the frequency divider pulse 1050, a divide-by-five pulse.

The character position of data codes which are gated to the comparator 500 for each subscan are shown in FIG. 7. At the end of the subscan 1, data initially stored in position 135 appears at the comparator. It is desired at the start of subscan 2, that the data code representative of data to be printed in position 2 appear at the comparator. The memory capacity is 150 positions. Hence 15 dummy shifts of data must be executed before The comparison is made. Fifteen dummy shifts are executed and the data in register position 150 is shifted to position one. Scan 2 starts with four clock pulses to memory 400 and data originally in position 4 is shifted to position 1 and gated to comparator 500.

At the end of subscan 5, the data for character position 131 is in position 1 of the shift registers 400. To recycle to subscan 1 again, the data for character position 1 must appear in register position 1. Twenty dummy shifts must be executed. Twenty clock pulses are transmitted to memory 400.

FIGS. 8 to 10 depict the clock and timing circuitry in detail. The circuits are interdependent and interconnected with one another.

The clock 1010, FIG. 8, includes a pair of monostable multivibrators 1011 and 1012 connected with the reset leads 1017 and 1018 of one to the set terminal of the other. Both circuits are connected to associated AND gates 1013 and 1014, respectively. The "high" outputs of each clock produce output pulse trains of a duration of 720 and 580 nanoseconds, respectively, which are fed to trailing edge pulse generators, 1015 and 1016, producing the clock pulses designated as the early and late clock pulses. The "low" terminal outputs, 1017 and 1018, of each of the multivibrators 1011 and 1012, are connected through the AND gates 1014 and 1013, respectively, to the reset terminal of the other of the multivibrators 1012 and 1011.

An OR gate 1023 is fed by an AND gate 1022. The output of AND gate 1021 feeds OR gate 1023 and also feeds the set terminal of a print flip-flop 1024. The output of OR gate 1023 feeds a start clock flip-flop 1025 set terminal.

The reset terminal of flip-flop 1025 is fed by an OR gate 1026, which in turn is fed by AND circuits 1027 and 1028.

The start of a print phase is signaled by all inputs to gate 1021 being high; the load phase is not occurring, $\overline{\text{LOAD}}$, and the READY signal indicates that power is up, bailing and paper feed is not being performed and other functions not germane to the invention are or are not occurring. Upon receipt of the next character mark by sensor 800, print flip-flop 1024 is set by the output from gate 1021. This output is also fed to set start clock flip-flop 1025 via OR gate 1023 and a start clock signal is fed therefrom to AND gate 1013 which starts the clock, producing waveforms OS1 and OS2, FIG. 11. Early and late clock pulses are generated by circuits 1015 and 1016, respectively. Thus, it is seen that all other conditions being proper, at the start of a print cycle the next clock mark from band 300 starts the clock. Since this other AND gate 1022 has an input $\overline{\text{SUBSCAN 1}}$, the trailing edge of the READY pulse will set clock flip-flop 1025 for subscans two to five. Hence at the start of each scan, the clock is resynchronized by the character mark pulses for sensor 800.

The clock is reset by the combination of AND gates 1027 and 1028 and OR gate 1026. The clock is not stopped at the end of a subscan, but is stopped after the necessary dummy shifts have been accomplished in character generator 600 and memory 400. AND gate 1027 stops the clock after subscans one to four and AND gate 1028 stops the clock after subscan five. The output of AND gate 1028 serves as a set input to the first input of the scan counter, FIG. 11.

Late clock input pulses from the circuit 1016 feed the frequency divider 1030, FIG. 9. The circuit consists of flip-flop stages 1031, 1032, and 1033 in cascade having high level outputs designated EC1, EC2, and EC3, respectively. Flip-flop 1031 is fed by AND gate 1034.

The circuit 1030, counts the late clock pulses and upon receipt of every fifth late clock pulse produces an output pulse.

The end shift counter 1040, FIG. 10, is a two-stage counter having flip-flops 1041 and 1042 connected in cascade. Flip-flop 1041 is connected to AND gate 1043 which in turn is connected to input lines designated by EC3 pulse, divide-by-five, and hammer firing pulses. Outputs ESC1 and ESC2 are generated during the firing cycle after each fifth and tenth late clock pulse.

The scan counter 1050, FIG. 11, is a six-bit counter having six cascaded flip-flops 1051 to 1056, which counter produces an output signal after receipt of 64 input pulses from AND gate 1028 of the clock 1010, FIG. 8. Thus, at the end of each fifth subscan the counter 610 is stepped by one count. At the end of the 64th scan, the output of the circuit 1050 is fed to the reset terminal of the print flip-flop 1024, FIG. 8, to indicate that the print cycle is over.

FIG. 12 shows a character mark pulse which is sensed by sensor 800 and delivered to AND gate 1021, FIG. 8. Assuming the $\overline{\text{LOAD}}$ and READY signals are high upon receipt of this pulse, the print flip-flop 1024 is set. The $\overline{\text{PRINT}}$ signal is fed via OR gate 1023 to set the start clock flip-flop 1025 and a START CLOCK level is delivered to AND gate 1013 along with a pulse from monostable multivibrator 1012 via lead 1018 to start monostable multivibrator 1011, producing the first OS1 pulse. This pulse fed to trailing edge detector also produces the first of the early clock pulses. The multivibrator remains on for 720 nanoseconds and then switches to its other state causing lead 1017 to be high, feeding a signal via gate 1014 to switch multivibrator 1012 on for the duration of 580 nanoseconds, OS2. The OS2 pulse is fed to trailing edge detector 1016 which produces late clock pulses. At the end of 580 nanoseconds, the low terminal of multivibrator 1012 feeds a signal to AND gate 1013 which in combination with the START CLOCK signal from flip-flop 1025 triggers circuit 1011 to initiate another clock cycle.

The pulse EC 3, FIG. 12, is generated by the frequency divider of FIG. 9. Both clock pulses from detector 1016 are fed to this counter circuit. Upon the receipt of the fourth such pulse, flip-flop 1033 is high and until the next late clock pulse resets the flip-flop, the signal remains on whereupon a divide-by-five pulse is initiated.

The character counter 610, FIG. 13, is a six-bit counter consisting of cascaded flip-flop 611 to 616. The preset circuit 620 consists of AND gate 620 having an input from fiduciary sensor 900 and a $\overline{\text{PRINT}}$ input from the print flip-flop 1024, FIG. 8. Outputs from this gate 620 set counter stages 611 and 616 producing the preset character code for type character "A", 10001.

The increment-by-one circuit 630 consists of an OR gate 631 connected to the least significant bit position of counter 610, flip-flop 611, and further consists of two AND gates 632 and 633, which provide inputs to OR gate 631.

The decrement-by-four circuit 650 consists of an OR gate 651 connected to flip-flop 613 of the counter 610. OR gate 651 is fed by AND gates 652, 653, 654.

The output of AND gate 632 steps the counter by one upon the receipt of character marks from sensor 800 during the non-print cycles to keep the character generator count updated as described hereinbefore.

EC3, FIG. 14 and 15, pulses are generated, FIG. 9, between each fourth and fifth late clock pulse and EC2 pulses are generated between each second and fourth late clock pulse. ESC1 and ESC2 pulses from endshift counter 1040, flip-flops 1041 and 1042 are generated following the receipt of the first and second EC1 pulses, respectively during the occurrence of a fire pulse.

FIG. 14 depicts the timing necessary to execute decrement-by-four shifts during the subscans and dummy shifts in the character counter 610 after subscans one to four: six decrement-by-four shifts and one increment-by-one shift; FIG. 15 depicts the timing necessary to execute dummy shifts in the character counter 610 after subscan five.

Referring now to FIGS. 13 and 14, AND gate 652 is high producing a decrement-by-four signal from circuit 650 upon the occurrence of a divide-by-five waveform, FIG.12, a late clock pulse and a ready signal. Recalling the memory 400 is shifted by five positions for each comparison and the character counter is shifted by four counts for each comparison.

Dummy shifts in the code counter 610, subscans one to four, are executed only when hammers are firing, following each subscan, and upon the receipt of a $\overline{\text{ESC2}}$, FIG. 10. From FIG. 14 it is seen that six decrement-by-four pulses are gated to OR gate 651 from AND gate 653 before the $\overline{\text{ESC2}}$ pulse is high.

The increment-by-one pulse executed during a dummy shift is generated by gate 633 after the clock has been stopped by AND gate 1027, and upon receipt of the last early clock pulse.

Fifteen early clock pulses corresponding to 15 pulses from clock clip-flop 1011 are gated to memory prior to stopping of the clock, FIG. 6.

Referring to FIG. 15, six decrement-by-four pulses are gated to character code counter 610 by AND gate 653 and OR gate 651, as described supra. During the fifth subscan, however, an additional decrement-by-four pulse is passed by AND gate 654 upon the occurrence of the 20th early clock after the subscan or when an early clock pulse arrives in coincidence with an output from both stages of the end shift counter, ESC1 and ESC2, and an output from the stage of divide-by-five flip-flop 1032.

Thereafter, AND gate 633, passes an increment-by-one pulse to character counter 610 to complete the dummy shifts of the counter during subscan five. Twenty early clock pulses have been received by memory to shift memory input by twenty cells at the end of subscan five, see FIG. 6.

Since 15 or 20 dummy shifts of memory 400 must be made prior to commencement of a subscan, the clock must continue for 15 or 20 pulses OS1 from clock flip-flop 1011.

From an examination of FIG. 13, it is evident that following scans one to four, the coincidence of pulses ESC2 and EC2 occurs only during the receipt of the 15th late clock pulse, hence AND gate 1027 will only reset the flip-flop 1025 after the necessary clock pulses have been received.

Similarly, following subscans 5, FIG. 14, the simultaneous occurrence of a late clock pulse, and outputs ESC1, ESC2, and EC2, FIGS. 8 and 9 occurs only during the 20th late clock pulse to gate AND gate 1028.

It is seen that the increment by one AND gate 633 will only pass the last early clock pulse via enabled AND gates 1027 and 1028, FIG. 7.

Other embodiments will occur to those skilled in the art and are within the following claims:

What is claimed is:

1. An impact printer comprising a continuously moving type carrier with a number of characters thereon defining at least one type font, a plurality of sets of impacting hammers, *each hammer having a position within one of said sets, the hammers in like positions among the sets being simultaneously in alignment with respective ones of said characters,* said hammers being adapted to be moved from a cocked position to an impact position, the total number of hammers equal to the number of character positions defining a line of print, each line of print being applied sequentially, holding means for maintaining each of said hammers in said cocked position, releasing means coupled to each of said holding means and responsive to activation thereof for selectively releasing each hammer to said impact position to coact withsaid carrier and thereby impacting a print medium, each hammer having a predetermined flight time from said cocked position to said impact position, a plurality of *time-shared hammer* drivers *in one to one correspondence with said hammer sets* coupled to said releasing means for selective activation thereof by application thereto of a release pulse said release pulse being of substantially less duration than said hammer flight time, means for coupling each said driver to various ones of said releasing means during each said line print sequence [for supplying] *and adapted to supply*a plurality of sequential release pulses from [at least one] *each* driver to a plurality of releasing means *respectively associated with the hammers of the set corresponding to said driver,* during a single hammer flight time, *release pulses being simultaneously applied to release means associated with hammers occupying like positions in different sets,* a first sensing means responsive to said character type and coupled to a character code generator, a memory containing sequences of desired character information, a comparator, said comparator responsive to said memory and said character code generator and coupled to said drivers for selectively actuating said drivers to release hammers in accordance with said sequences of desired character information, a plurality of fiduciary marks on said type carrier, second sensing means responsive thereto, a timing means responsive to said second sensing means for providing timing pulses, and means coupling said timing pulses to said comparator and said driver for synchronizing operation thereof in accordance with character position relative to hammer locations.

2. The printer of claim 1 further comprising:

magnetic means for restraining said hammers against movement when in said cocked position.

3. The printer of claim 2 wherein said magnetic means is a permanent magnet.

4. The printer of claim 3 wherein said release means comprise electrical coils wound about said magnets.

5. The printer of claim 4 wherein said release means further comprises:

means to pass a current through said coils to create a magnetic force in opposition to the magnetic force of said magnets.

6. The printer of claim 1 wherein the spacing between type characters on said carrier is different from the spacing between character positions on said line.

7. The printer of claim 6 wherein the spacing between type characters is greater than the spacing between character positions.

8. The combination of claim 1, wherein said character code generator comprises a character counter having an output coupled to said comparator, a preset means responsive to said second sensing means for resetting said character code counter, a variable delay means responsive to said first sense means and coupled to said character code counter by an increment by one device, and a decremental device coupling said second means to said character code counter, said decremental device reducing the input character count to said character code counter by the frequency at which hammers and characters are in registration.

9. The combination of claim 1, wherein said character code generator responds to said second sensing means and is set in response to a fiduciary mark, and responds to said first sensing means by stepping a count of one for each sensed character mark, whereby said character generator is kept current with movement of said carrier.

10. An impact line printer comprising a continuously moving type carrier with a number of characters thereon defining at least one type font, a plurality of sets of impacting hammers, *each hammer having a position within one of said sets, the hammers in like positions among the sets being simultaneously in alignment with respective ones of said characters,* said hammers being adapted to be moved from a cocked position to an impact position, each line of print being applied sequentially, said hammer centers being positioned closer together than said type characters, said hammers operative by release of stored kinetic energy retained by said cocked hammers, holding means for maintaining each of said hammers in said cocked position, releasing means coupled to each of said holding means and responsive to activation thereof for selectively releasing each hammer to said impact position to coact with said carrier and thereby impacting a print medium, each hammer having a predetermined flight time from said cocked position to said impact position, a plurality of *time-shared* drivers *in one to one correspondence with said hammer sets* coupled to said releasing means for selective activation thereof by application thereto of a release pulse, said release pulse being of substantially less duration than said hammer flight time, means for coupling each said driver to various ones of said releasing means during each line print sequence [for supplying] *and adapted to* a plurality of sequential release pulses from [at least one] *each* driver to a plurality of releasing means *respectively associated with the hammers of the set corresponding to said driver,* during a single hammer flight time, *release pulses being simultaneously applied to release means associated with hammers occupying like positions in different sets,* a first sensing means responsive to said character type and coupled to a character code generator, a memory containing sequences of desired character information, a comparator, said comparator responsive to said memory and said character code generator and coupled to said drivers for selectively actuating said drivers to release hammers in accordance with said sequences of desired character information, a plurality of fiduciary marks on said type carrier, second sensing means responsive thereto, a timing means responsive to said second sensing means for providing timing pulses, and means coupling said timing pulses to said comparator and said driver for synchronizing operation thereof in accordance with the position of a character relative to a hammer location.

11. An impact line printer comprising a continuously moving type carrier with a number of characters thereon defining at least one type font, a plurality of sets of impacting hammers, *each hammer having a position within one of said sets, the hammers in like positions among the sets being simultaneously in alignment with respective ones of said characters,* said hammers being adapted to be moved from a cocked position to an impact position, holding means for maintaining each of said hammers in said cocked position, releasing means coupled to each of said holding means and responsive to activation thereof for selectively releasing each hammer to said impact position to coact with said carrier and thereby impacting a print medium, each hammer having a predetermined flight time period from said cocked position to said impact position, a plurality of *time-shared* drivers *in one to one correspondence with said hammer sets* coupled to said releasing means for selective activation thereof by application thereto of a release pulse, said release pulse being of substantially less duration than said hammer flight time period, means for coupling each said driver to various ones of said releasing means during each line print sequence [for supplying] *and adapted to supply*a plurality of sequential release pulses from [at least one] *each* driver to a plurality of releasing means *respectively associated with the hammers of the set corresponding to said driver,* during a single hammer flight time period, *release pulses being simultaneously applied to release means associated with hammers occupying like positions in different sets,* a first sensing means responsive to said character type and coupled to said drivers for selectively actuating said drivers to release hammers in accordance with desired character information, a source of sequential timing signals, second sensing means responsive to said timing signals, a timing means responsive to said second sensing means for providing timing pulses derived from said timing signals, and means coupling said timing pulses to said drivers for synchronizing operation thereof in accordance with the position of a character relative to a hammer location.

12. The combination of claim 11, wherein each said release pulse duration is less than one quarter of the average hammer flight time.

13. The printer of claim 11 further comprising: magnetic means for restraining said hammers against movement when in said cocked position.

14. The printer of claim 13 wherein said magnetic means is a permanent magnet.

15. The printer of claim 14 wherein said release means comprise electrical coils wound about said magnets.

16. The printer of claim 15 wherein said release means further comprises:

means to pass a current through said coils to create a magnetic force in opposition to the magnetic force of said magnets.

17. The printer of claim 11 wherein the spacing between type characters on said carrier is different from the spacing between character positions on said line.

18. The printer of claim 17 wherein the spacing between type characters is greater than the spacing between character positions.

*19. A printer according to any of claims 1, 10, or 11, where the hammers in each set are adjacent one another.*

* * * * *